United States Patent
Bauer

[15] 3,665,381
[45] May 23, 1972

[54] MOVABLE COIL BI-GRADIENT TRANSDUCER

[72] Inventor: Benjamin B. Bauer, Stamford, Conn.

[73] Assignee: The United States of America as represented by the Secretary of the Navy

[22] Filed: Jan. 25, 1971

[21] Appl. No.: 109,347

[52] U.S. Cl.....................................340/8, 340/11, 340/17
[51] Int. Cl. ......................................................H01b 13/00
[58] Field of Search ..................................340/8, 11, 13, 17

[56] References Cited

UNITED STATES PATENTS 2,311,079   2/1943   Parr, Jr. ...............................340/13 R Primary Examiner—Benjamin A. Borchelt
Assistant Examiner—H. J. Tudor
Attorney—R. S. Sciascia and Henry Hansen

[57] ABSTRACT

A movable coil bi-gradient transducer responsive to the angle of arrival of a given sound wave. An orthogonal array of four coils are embedded in a flat non-magnetic disk and suspended in the air gap of an annular magnetic unit by four thin rods. Opposite coils are wired in series with only their outer halves normally in the annular field of flux whereby the combined voltages of the coils is equal to zero. A cylindrical acoustically transparent boot, filled with silicon oil, encases the magnetic unit and suspended disk. Acoustic pressure waves arriving at the outside of the boot are transmitted through the silicone oil causing lateral displacement of the four coils in the same direction as the pressure wave to produce electrical output signals at respective pairs of coils indicative of the sine and cosine functions of the arrival angle of the pressure wave.

7 Claims, 4 Drawing Figures

Patented May 23, 1972
3,665,381
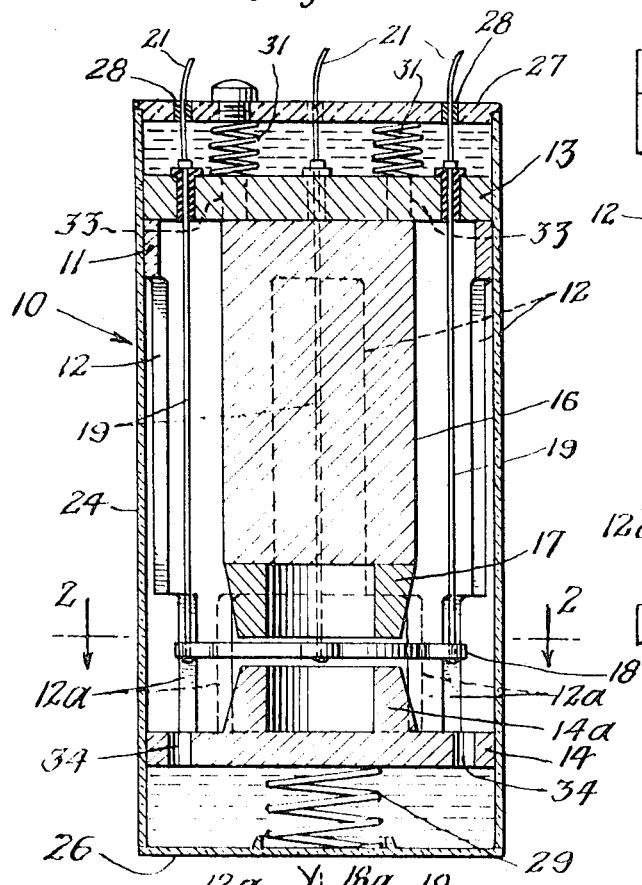
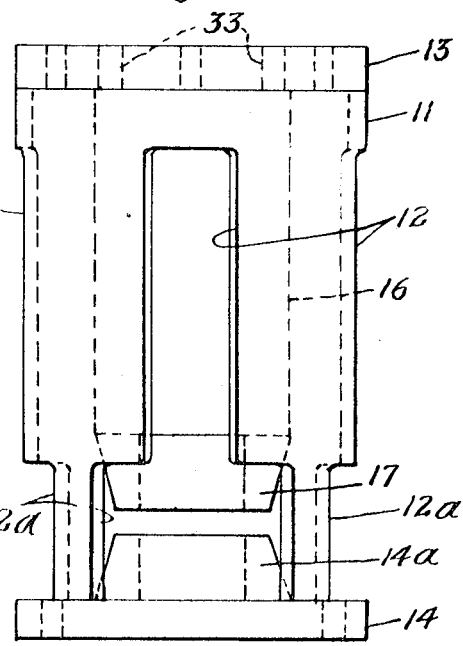
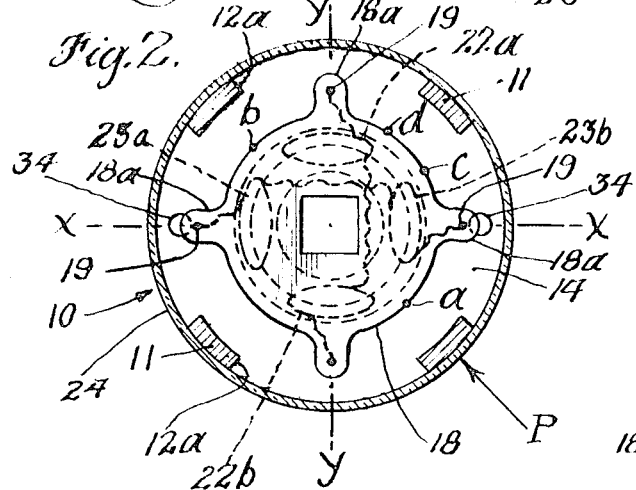
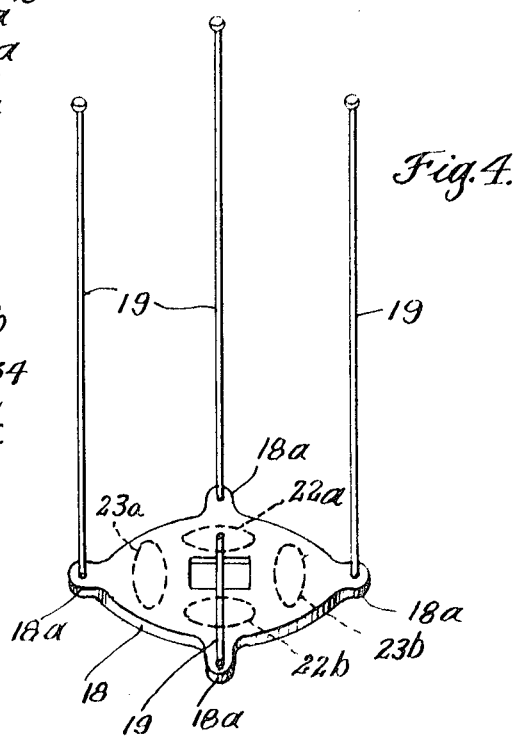
INVENTOR
BENJAMIN B. BAUER
BY
Henry Hansen
ATTORNEY

3,665,381

MOVABLE COIL BI-GRADIENT TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to electromagnetic transducers, and more particularly to electromagnetic transducers directionally responsive to acoustic waves.

Directional response is usually obtained in an acoustic transducer or, in underwater sound detectors such as a hydrophone, by measuring the velocity or pressure gradient of the propagated acoustic wave at the transducer. The direction to the sound source in any one plane may be determined by scanning the transducer about an axis perpendicular to the plane and observing the direction at which peak sound level is obtained. The direction may also be determined with two orthogonally positioned directional transducers and observing the sine and cosine relationship of the signals. The first-mentioned transducer requires considerable mechanization to cause precise rotation relative to a fixed bearing and loses target signals for a considerable part of the scanning cycle. The latter-mentioned transducer obtains continuous measurement of target signals but requires a double-transducer configuration which is relatively large and expensive.

SUMMARY OF THE INVENTION

It is the general purpose of the present invention to provide a novel and improved directional transducer which offers precise sine and cosine signal response in a single, compact unit. It is also an object of the invention to provide a more rugged and reliable directional hydrophone which is smaller in size than presently available hydrophones, which has greater uniformity in response and resonance, simpler in design, and easier to manufacture at relatively low cost.

Briefly, these and other purposes and objects of the invention are accomplished by a unique movable coil bi-gradient transducer in which a flat coil element is suspended on four rods within an annular magnetic field for free lateral motion in response to acoustic waves. The element contains an embedded matrix of four miniature coils spaced 90° apart and radially positioned with the outer side of each coil within the annular magnetic field. Opposite coils are electrically connected into two pairs producing independent output voltages respectively indicative of the sine and cosine components of the sound wave in the plane of the element from which direction can be determined by well-known techniques.

BRIEF DESCRIPTION OF THE DRAWINGS

FIG. 1 represents a vertical cross-sectional view of a bi-gradient transducer constructed in accordance with the invention;

FIG. 2 represents a cross-sectional of the transducer taken on the line 2—2 of FIG. 1;

FIG. 3 represents a detail elevational view of the magnet unit of the transducer of FIG. 1; and FIG. 4 represents a detail angular view of the coil element and the suspension wires of the transducer of FIG. 1.

DESCRIPTION OF THE PREFERRED EMBODIMENT

Referring now to FIG. 1, there is shown a bi-gradient transducer 10 having a cylindrical cage 11 formed with four equally spaced slits 12 about the circumference. Each slit 12 commences near the upper end and terminates at the lower end with enlarged openings 12a. A circular top and bottom plates 13 and 14 are concentrically affixed to the upper and lower ends respectively of cage 11. Bottom plate 14 is formed on the upper surface with an annular tapered lower pole piece 14a forming an annular planar surface concentric with and normal to the length of cage 11. A solid cylindrical magnet 16, preferably Alnico V polarized along its length, is concentrically affixed at one end to the lower surface of top plate 13. An annular upper tapered pole piece 17 is concentrically affixed to the other end of magnet 16 forming an annular planar surface aligned with and parallel to the planar surface of pole piece 14a. Cage 11, plates 13 and 14, and pole pieces 14a and 17 are ferromagnetic and as combined with magnet 16 form an annular magnetic field in the space between pole pieces 14a and 17 and constitute an air gap preferably approximately 0.10 inches.

A flat movable coil element 18 is mechanically suspended in the air gap parallel to the confronting surfaces of pole pieces 14a and 17 by four thin rods 19 secured to and electrically insulated from top plate 13. The rods 19 simultaneously serve as electrical leads to terminals 21.

Movable coil element 18 is best described with reference to FIGS. 2 and 4 where it is shown as being generally a thin circular electrically non-conductive, non-magnetic disk having four lobes 18a spaced 90° apart about the periphery for receiving rods 19. Four miniature elliptical coils 22a, 22b, 23a and 23b, each preferably having 600 turns of No. 44 aluminum wire, are embedded in element 18 with their minor axes aligned 90° apart about the center of the element 18 and with their radially outward halves substantially fully immersed in annular flux path in the air gap when element 18 is concentric with pole pieces 14a and 17. Opposite coils 22a–22b and 23a–23b are wired as pairs, the coils in each pair forming two separate sine and cosine response channels respectively. Thus, when the outer halves of each coil pair are equally immersed in the annular magnetic field, the net voltage generated across the coils will be zero. The maximum sensitivity of coil pair 22a and 22b is along their common minor axes y—y (FIG. 2), and is along their common minor axes x—x for coil pair 23a and 23b. Therefore, each pair of coils constitutes a separate transduction channel, each exhibiting the cosine law pattern. By virtue of orientation in quadrature, one pair of coils is sensitive to the cosine and the other to the sine function of the angle of arrival of a given sound wave. Since the suspension is formed by the four symmetrical rods 19, the movable element 18 has perfectly symmetrical freedom of motion in all directions in the plane of element 18 and the resonant frequency along the two active modes, axes x—x and y—y is identical. For a hydrophone constructed according to the invention, the rods were designed to give a resonance in the region of 10 Hz.

The magnetic unit and element suspension system as described above is slidably received in an acoustically transparent cylindrical boot 24, preferably Plexiglas, sealingly enclosed at the lower end by a cover 26 and at the upper end by a cover 27 having elastic seals 28 for passing terminals 21 therethrough.

The magnetic unit is compliantly suspended between covers 26 and 27 by a single helical compression spring 29 between bottom cover 26 and bottom plate 14 and three helical compression springs 31 (only two being shown in FIG. 1) located between top cover 27 and top plate 13.

The remaining unoccupied volume in boot 24 is filled with silicone oil. Through-holes 33 in top plate 13 and through-holes 34 in bottom plate 14 permit free transfer of silicone oil with displacement of the magnetic unit along the length of boot 24.

Operation of the above-described bi-gradient transducer should now be apparent. Briefly, the transducer responds to the pressure difference between that part of the coil element 18 facing an impinging pressure wave and its opposite side. Referring to FIG. 2, in a freely-progressive sound field period such as experienced under water, an impinging pressure P first reaches point A and then point B. Because of the physical separation of these two points, there results a phase shift between the pressures impinging on them. Clearly, in terms of elemental areas, there is a greater phase shift between points A and B than between points C and D. The following equation yields the net force on element 18 due to the sound field pressure:

$$F_{NET} = jp\omega D^2 b/c \quad (1)$$

where
- $p$ = sound field pressure level in dynes/cm²
- $\omega = 2\pi f$ where f is signal frequency in Hz.
- $D$ = diameter of matrix in cm
- $b$ = thickness of matrix in cm
- $c$ = speed of sound in water, 154,000 cm/sec Equation (1) may be used to predict the electrical output of the hydrophone. The element velocity $v$ (in cm/sec) at frequencies above resonance (where the transducer is mass controlled) is, $$v = F_{NET}/j\omega m_t = pD^2b/cm_t \quad (2)$$

where
$m_t$ = effective mass of matrix element in gms.

The open-circuit voltage $e$, in volts, is $$e = Blv \times 10^8 \quad (3)$$

where
- $B$ = flux density in gauss
- $l$ = length of active conductor in cm.

Thus, combining equations (2) and (3), $$e = \frac{BlpD^2b \times 10^{-8}}{cm_t} \quad (4)$$

or $$e = \frac{BlD^2b \times 10^{-8}}{cm_t} \text{ for } p = 1 \text{ dyne/cm}^2. \quad (5)$$

which is the sensitivity of the hydrophone. In an anticipated range of operation for underwater sounds (20 to 300 Hz.) the electrical output of the hydrophone does not, theoretically, vary with frequency. This follows from equation (4), which indicates no dependence of the electrical voltage on frequency.

Some of the many advantages and novel features of the invention should now be readily apparent. For example, a bi-gradient hydrophone is provided which utilizes a single matrix element for achieving precise sine and cosine response. The resulting configuration is relatively simple and compact, rugged and small in size, and relatively inexpensive to manufacture. It is ideally suited for underwater acoustic detection systems such as used in sonobuoys and provides distinct advantages over directional hydrophones of the prior art.

It will be understood, of course, that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A bi-gradient electroacoustic transducer comprising:
   an acoustically transparent cylindrical housing sealingly enclosed at both ends;
   magnet means supported within and slidable along the length of said housing and forming a gap with an annular field of flux parallel to the length of said housing;
   a flat element having an annular matrix of four orthogonally positioned embedded coils, opposite ones of said coils being wired in series, and the outer halves of said coils being radially coextensive with the annular field of flux;
   four rods normally suspending said element coaxially in said gap and electrically connected to respective ones of said coils for transmitting signals therefrom; and
   a fluid completely filling the interstices formed by said magnet means, element and rods in said housing.

2. A transducer according to claim 1, further comprising:
   said magnet means including a cylindrical outer cage, and upper and lower end plates affixed to the ends of said cage, the gap being formed within said cage and between said end plates.

3. A transducer according to claim 2, further comprising:
   said magnet means including a magnet polarized along the length of said housing affixed at one pole to the upper plate.

4. A transducer according to claim 3, further comprising:
   said magnet means including an upper pole piece affixed to the other pole of said magnet and forming an annular planar surface at the gap, and a lower pole piece affixed to said lower plate and forming an annular planar surface at the gap and confronting said other surface in parallel and spaced relationship.

5. A transducer according to claim 4, further comprising:
   said upper and lower plates of said magnet means having openings formed therethrough for establishing free fluid communication between the ends of said housing.

6. A transducer according to claim 5, further comprising:
   compliant means interposed respectively between said upper and lower plates and the confronting ends of said housing for resiliently positioning said magnet means in a position intermediate the length of said housing.

7. A transducer according to claim 6, further comprising:
   said rods having an elasticity for uniform deflection along their lengths with lateral displacement of said element relative to said magnet means.

* * * * *